United States Patent [19]

Harada et al.

[11] Patent Number: 5,333,075
[45] Date of Patent: Jul. 26, 1994

[54] FERROELECTRIC LIQUID CRYSTAL MIXTURES CONTAINING LIPOHILIZING, LIPOPHILIC OR AMPHIPHILIC COMPOUNDS FOR ELIMINATING IONIC IMPURITIES

[75] Inventors: Takamasa Harada, Chiba, Japan; Claus Escher, Hofheim, Fed. Rep. of Germany; Gerd Illian, Tokyo, Japan; Anke Kaltbeitzel, Rüsselsheim; Norbert Rösch, Frankfurt am Main, both of Fed. Rep. of Germany

[73] Assignee: Hoechst Aktiengesellschaft, Frankfurt am Main

[21] Appl. No.: 47,688

[22] Filed: Apr. 15, 1993

[30] Foreign Application Priority Data

Apr. 20, 1992 [JP] Japan .................. 4-144734

[51] Int. Cl.$^5$ ........................... G02F 1/13
[52] U.S. Cl. ........................... 359/100; 359/104; 252/299.01
[58] Field of Search ............... 359/100, 104; 252/299.01, 299.6; 428/1

[56] References Cited

U.S. PATENT DOCUMENTS 5,019,451 5/1991 Lando .................. 428/1
5,135,678 8/1992 Murata et al. .......... 359/103

FOREIGN PATENT DOCUMENTS 0451820 10/1990 European Pat. Off. .
0451822 10/1990 European Pat. Off. .
0404081 12/1990 European Pat. Off. .
WO91/08272 6/1991 PCT Int'l Appl. .
WO91/20012 12/1991 PCT Int'l Appl. .

OTHER PUBLICATIONS

HOE 90/F 115 specification (which relates to EP 0,451,822).
HOE 90/F 117 specification (which relates to EP 0,451,820).
HOE 89/F 377K specification (which relates to EP 0,040,081).
HOE 89/F 197k specification (which also relates to EP 0,040,081).

*Primary Examiner*—William L. Sikes
*Assistant Examiner*—Huy Mai
*Attorney, Agent, or Firm*—Curtis, Morris & Safford

[57] ABSTRACT

Electro-optical display devices having a cell thickness of 1 to 10 μm, and containing ferroelectric liquid crystalline mixture, electrodes, alignment layer(s), in which the ferroelectric liquid crystalline mixture has a spontaneous polarization of $Ps > 20 nC.cm^{-2}$ and a natural helical pitch of less than a half of the cell thickness, and contains lipophilizing, lipophilic or amphiphilic compounds for eliminating ionic impurities, Ferroelectric liquid crystal compositions according to the invention show a significantly reduced surface memory effect and an improved display contrast.

6 Claims, No Drawings

FERROELECTRIC LIQUID CRYSTAL MIXTURES CONTAINING LIPOHILIZING, LIPOPHILIC OR AMPHIPHILIC COMPOUNDS FOR ELIMINATING IONIC IMPURITIES

The present invention relates to ferroelectric liquid crystal mixtures having a high spontaneous polarization and a short helical pitch, as well as to the use of the ferroelectric liquid crystal mixtures for electro-optical switching and display devices. Particularly, the invention relates to ferroelectric liquid crystal mixtures which contain lipophilizing or lipophilic compounds (these compounds together are referred to as lipophilic compounds hereinafter), or amphiphilic compounds having cyclic structure or being able to form cyclic or basket-like structure.

PRIOR ART

Switching and display devices containing ferroelectric liquid-crystal mixtures (FLC displays) are known, for example, from EP-B 0 032 362 (=U.S. Pat. No. 4,367,924). Liquid-crystal light valves are devices which, for example as a consequence of electrical actuation, modify their optical transmission properties in such a manner that incident light (which may be reflected again) is modulated in intensity. Examples are conventional watch and calculator displays or liquid-crystal displays in the OA (office automation) or TV sectors. However, these also include light shutters as are employed in photocopiers, printers, welding goggles, polarized spectacles for 3D viewing, etc. Spatial light modulators are also applications for liquid-crystalline light valves (see also Liquid Crystal Device Handbook, Nikkan Kogyo Shimbun, Tokyo, 1989; ISBN 4-526-02590-9C 3054 and the papers cited therein).

Electro-optical switching and display elements are constructed in such a manner that a liquid-crystal layer is surrounded on both sides by layers which are usually, in this sequence starting from the FLC layer, at least one alignment layer, electrodes and an outer plate (for example made of glass). In addition, they contain one polarizer if they are operated in "guest-host" or in reflective mode, or two polarizers if transmissive birefringence mode is used. The switching and display elements may also contain further auxiliary layers, such as, for example, diffusion barrier or insulation layers.

The alignment layers, which comprise an organic (for example polyimide, polyamide or polyvinyl alcohol) or inorganic (for example SiO) material, bring, together with a spacing between the outer plates which is chosen to be sufficienty small, the FLC molecules of the FLC mixture into a configuration in which the molecules are arranged with their longitudinal axes parallel to one another and the smectic planes are disposed perpendicular or obliquely to the orientation layer. In this arrangement, as is known, the molecules have two equivalent orientations, between which they can be switched by pulsed application of an electric field, i.e. FLC displays can be switched in a bistable manner and the switching times are in the $\mu$s range, these being inversely proportional to the spontaneous polarization of the FLC mixture.

The essential advantage of such FLC displays as compared with the LC displays which can still to date essentially be encountered in industrial practice is considered to be the attainable multiplex ratio, i.e. the maximum number of lines which can be driven in the times-sequential process ("multiplex" process), which is significantly larger in the case of FLC displays. This electrical drive is essentially based on the above-described pulsed addressing, which has been described by way of example in SID 85 DIGEST p.131 (1985).

In the case of the hitherto known FLC displays, generally the spacing of the boundary plates is chosen in such a manner that the development of the twist ("helix") typical of ferroelectric phases is suppressed. This takes place in such a manner that—see the initially cited EP-B—the spacing of the plates is smaller than approximately five times the natural helical pitch. However, on account of the optical switching behavior and for general technological reasons, there is virtually no possibility of setting the spacing of the plates to be arbitrarily small, so that in practice a spacing of approximately 2 $\mu$m is adopted. For this reason, efforts were hitherto made to develop FLC mixtures having the greatest possible helical pitch; this has also recently been made subject to further demands (Gray et al., Thermotropic Liquid Crystals, 1987) according to which the spacing of the plates should be less than one quarter of the helical pitch.

Examples of FLC mixtures having a high spontaneous polarization and short helical pitch are also described in JP-A 38623/91.

In the course of the recent further development of FLC displays, a disadvantage has however emerged, which resides in that the aforementioned pulsed addressing leads to a reproducible switching between the two stable states frequently only in the case of sufficiently small values for the spontaneous polarization.

By way of example, it may be observed that in an FLC display which has been situated for a relatively great length of time in one of the two stable states ("standing image") switching over to the respective other state can take place only with very great difficulty, i.e. only with high amplitude or a very long pulse duration of the applied voltage. In the case of pictorial displays, this behavior of an optical hysteresis leads to a situation in which an image which has been inscribed over a relatively great length of time can be recognized in the following image, as a silhouette in the form of a "ghost image".

It appears that this observation of an optical hysteresis is the more marked, the greater the spontaneous polarization of the FLC mixture is.

In the case of particularly high values ($Ps > 35 nC \cdot cm^{-2}$), it is as a rule no longer possible to achieve any switching by means of pulsed addressing. Since, as is known, very short switching times can only be achieved through high polarization, this prevents, in particular, the use of very rapid FLC mixtures.

One of the hypotheses on the cause of the phenomenon of optical hysteresis is that ionic impurities in the FLC mixture are responsible (cf. for example B. J. Dijon et al., SID Conference, San Diego 1988, pages 2-249). The solutions known hitherto of a) direct contact between the FLC mixture and the electrodes and b) complex cleaning have not yet resulted in complete success; the first method is very complex due to the necessity for involving specific measures to avoid electrical short-circuits, and the second requires a specific type of cleaning for each component of a mixture and complex and expensive handling of the FLC mixture. A further solution has been proposed by M. Nitta et al. (Japanese Journal of Applied Physics 27 (1988)

1447), in which charge-transfer complexes (CTCs) are employed to improve the optical switching behavior.

A further serious disadvantage of FLC displays is, in addition, that they have, in the non-addressed state, (usually) undesired non-uniformity of the director (i.e. the preferential direction of the molecule) and one or more so-called twist states (see M. A. Handschy, N. A. Clark, S. T. Lagerwall; Phys. Rev. Lett. Vol. 51, 471 (1983): M. Glogarova, J. Pavel; J. Phys. (France) Vol. 45, 143 (1984): N. Higi, T. Ouchi, H. Takezoe, A. Fukuda; Jap. J. Appl. Phys. Vol. 27, 8 (1988)). In the memory state and in multiplexed mode this non-uniformity results in a considerable reduction in contrast in the display, in particular because the opaque state becomes considerably less dark (gray dark state). The contrast is the ratio between the transmissions in the bright and dark switching states. The appearance of twist states is, in addition, frequently associated with wavelength dispersion, which can result in false colors in the display. Currently, maximum contrast values of from 5 to 10 are given for FLC displays. An exception are displays in which the alignment layer used is SiO vapor-deposited at an angle which have higher values for the contrast, but are rarely encountered due to the considerable costs for applying the SiO layer.

It has already been attempted to suppress the appearance of interfering twist states through a suitable choice of alignment layers, but hitherto only with unsatisfactory results. The virtually uniform states which sometimes occur (for example when SiO vapor-deposited at an angle is used) very frequently proved to be unstable and dropped back into twist states. The occurrence of twist states appears to be favored by high spontaneous polarization, in particular when ferroelectric-crystal mixtures are used (in this respect, cf, M. A. Handschy and N. A. Clark; Ferroelectrics 59, 69 (1984)). However, such mixtures are particularly suitable since they result in short switching times.

In order to achieve a short switching time, it is required develop FLC mixtures having a high spontaneous polarization, because, as mentioned above, switching times are inversely proportional to the spontaneous polarization of the FLC mixture. However, as the FLC mixture has higher spontaneous polarization, it has greater tendency exhibit optical hysteresis, and thus causes problems such as ghost image (surface memory effect). This problem becomes more serious when a structure of FLC layer is changed from a chevron geometry to a bookshelf geometry by applying a low-frequency electric field. It is required, therefore, that the development of FLC components having both a high spontaneous polarization and an ability of eliminating ionic impurities, so that the surface memory can be significantly reduced especially in a bookshelf geometry, and an improved display contrast can be achieved.

Accordingly, the object of the present invention is to provide FLC mixtures which exhibit a very low optical hysteresis despite of a high spontaneous polarization, and thus do not cause problems of the surface memory. Preferably, the FLC mixture is in a uniform state rather than a twist state, so that it generates a higher optical contrast.

Another object of the present invention is to provide electro-optical switching and display devices using the above mentioned FLC mixtures. The display devices can be operated in a multiplex mode, and can work both in-birefringence mode and guest-host mode.

The present invention relates to ferroelectric liquid crystal mixtures having a spontaneous polarization of $Ps>20nC.cm^{-2}$ and a natural helical pitch of less than one half of the cell thickness, comprising lipophilizing, lipophilic or amphiphilic compounds. Additionally, the invention relates to electro-optical display devices having a FLC layer thickness of 1 to 10 $\mu$m and comprising FLC mixtures mentioned above, electrodes and alignment layer(s).

According to the invention, in such FLC displays that have a cell gap (i.e. spacing of the boundary plates) of 1 to 10 $\mu$m, and especially of 1.2 to 3 $\mu$m, use is made of those FLC mixtures which exhibit a high spontaneous polarization of $Ps>20nC.cm^{-2}$, and exhibit a natural helical pitch of less than one half of the layer thickness of the aforementioned SSFLC displays, in particular of more than 1/10 of this layer thickness.

In preferred embodiments, the ferroelectric phase is an Sc* phase and the phase sequence of the FLC mixture proceeds as follows:

in this case in the entire temperature range of the N, phase the helical pitch is no less than 8 $\mu$m, preferably no less than 15 $\mu$m. The stated properties (i.e. high spontaneous polarization, a first specified helical pitch in the smectic phase and a second specified helical pitch in the cholesteric phase) are in particular satisfied by non-chiral LC basic mixtures, to which two or more appropriate chiral dopants are added. Expendiently, such chiral dopants contribute to the extent of at least 20% to the spontaneous polarization of the total mixture, possess the same sign in the values of the spontaneous polarization; at the same time, they contribute to the extent of at least 20% to the natural helical pitch in the smectic phase and have an identical sense of rotation in their twist capacity; in the N, phase, two of the chiral dopants do moreover exhibit differing signs (non-identical sense of rotation) in their twist capacity, Display devices of the present invention include displays in which the structure of smectic layer is a bookshelf geometry or a quasi-bookshelf geometry. These structures may also be formed by an electric field treatment. Display devices in which a tilt angle of the bookshelf geometry or the quasi-bookshelf geometry is less than 10° are also included in the invention, The chemical compounds which satisfy the aforementioned conditions in non-chiral LC basic mixtures include, in particular, those of the general formula (I) and (II)

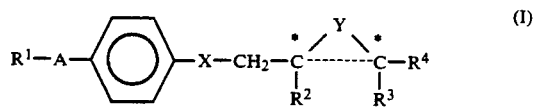

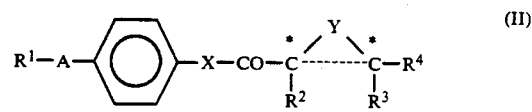

where the symbols and indices have the following meaning:

$R^1$ = straight-chain or branched-chain ($C_1$-$C_{12}$) alkyl, in which one or two non-adjacent —$CH_2$— groups may be replaced by —O— and/or —S—;
A = diazin-2,5-diyl or azin-2,5-diyl;

X, Y=O and/or S;

R², R³, R⁴=independently of one another H, straight-chain ($C_1$-$C_{10}$) alkyl or branched-chain ($C_3$-$C_{10}$) alkyl, in which R², R³ and R⁴ are not simultaneously H.

In particularly preferred embodiments the symbols and indices have the following meaning:

R¹=straight-chain ($C_5$-$C_{11}$) alkyl, in which a —CH₂— group can be replaced by —O— or —S—;

X, Y=0;

R², R³=H;

R⁴=straight-chain or branched-chain ($C_3$-$C_7$) alkyl;

A=pyrimidin-2,5-diyl.

Surprisingly, using the aforementioned FLC mixture it was even possible to suppress the—in the present case undesired—development of a helix in the ferroelectric phase, if the layer thickness is greater than 10 times the natural helical pitch. Even in FLC mixtures having natural helical pitches of <0.7 μm in the ferroelectric phase, no optical hysteresis occurs at high Ps values; at Ps values of >100nC.cm⁻², no "ghost images" observed any longer were. Further advantages of the invention reside in the retention of the short switching times and in the possibility of portraying grey gradations.

According to the present invention, the FLC mixtures include lipophilic or amphiphilic compounds. More precisely, FLC mixtures of the invention include additives of lipophilic or amphiphilic compounds which can reduce an optical hysteresis by trapping ionic impurities of the FLC mixture thus preventing twist states. The lipophilic or amphiphilic compounds used are preferably electrically neutral complex ligands for cations which contain at least two donor centers of nitrogen, oxygen, sulphur and/or phosphorus. The most suitable additives for FLC mixtures of the invention are lipophilic or amphiphilic compounds which contain at least two nitrogen donor centers (or two nitrogen and 5 or 6 oxygen donor centers), and have double-cyclic or triple-cyclic structures. Most preferable additives are 18-member macrocyclic compounds.

According to the present invention, FLC mixtures contain at least one additive selected from a variety of lipophilic or amphiphilic compounds described below, such as macrocyclic compounds and amides.

More precisely, the lipophilic or amphiphilic compounds added to the FLC mixtures of the invention are at least one macrocyclic compound of the general formula (III):

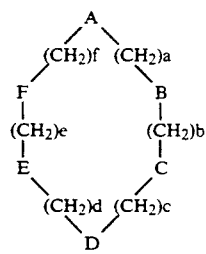 (III)

in which a, b, c, d, e, f, independently of one another, are an integer from zero to 4, a+b+c+d+e being greater than 7, and —A—, —B—, —C—, —D—, —E—, —F—, identical or different, are

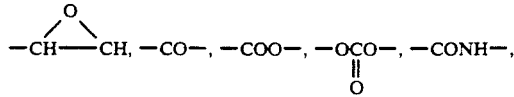

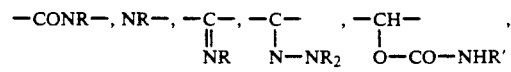

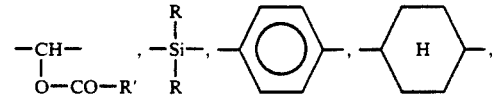

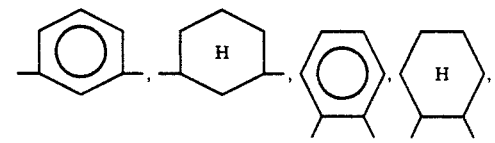

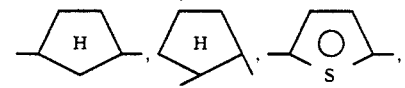

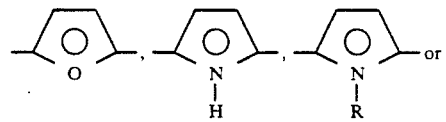

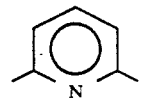

in which R can be alkyl of 1 to 12 carbon atoms, and R' can be alkyl of 1 to 12 carbon atoms, in which a —CH₂— group can be replaced by —O—, —COO— or —OCO—, phenyl or Cl, F or CN.

Preferably a ferroelectric liquid crystal mixture is used containing at least one macrocyclic compound of the formula (III), in which the symbols have the following meaning:

a, b, c, d, e, f, R, R' are as described above, —B—, —C—, —E—, —F— are a —CH₂— group and —A—, —D—, identical or different, are

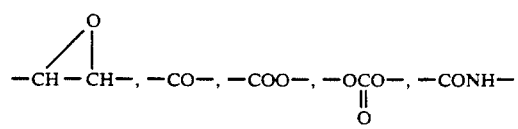

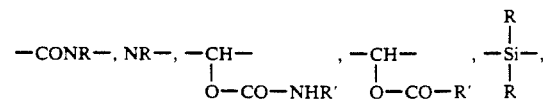

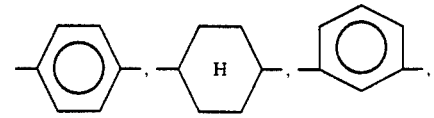

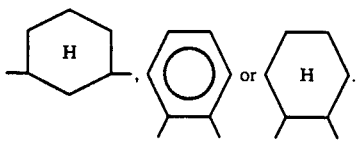

Particularly preferably, macrocyclic compounds according to the formula (III) are used in which the symbols have the following meaning:

a, b, c, d, e, f, independently of one another, are an integer from zero to 3, —B—, —C—, —E—, —F—, are a —CH$_2$— group —A—, —D—, identical or different, are

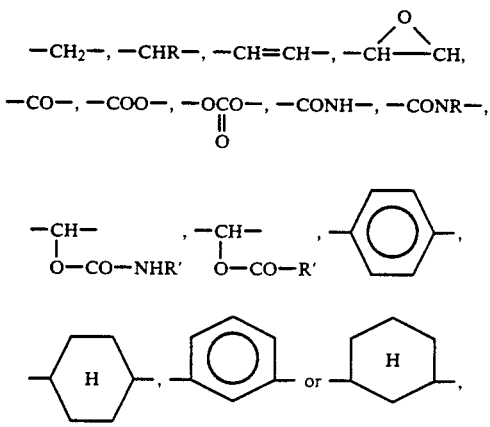

in which R is alkyl of 1 to 12 carbon atoms, and R' is alkyl of 1 to 12 carbon atoms or phenyl.

Particularly preferably, the groups —A—, —D—, have the following meaning:

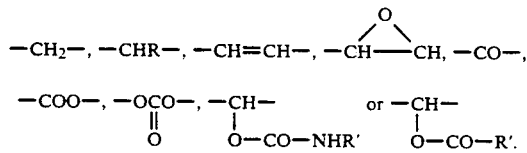

In principle, a wide range of macrocyclic compounds—i.e. cyclic compounds of 13 or more members; for restrictions, see, for example, O. A. Neumüller (ed.), Römpps Chemie-Lexikon, 8th edition, Frankh'sche Verlagsbuchhandlung, Stuttgart 1989—suitable for use in liquid crystal mixtures, but macrocycles of the formula (III) just described are particularly suitable for suppressing twist states. The lipophilic or amphiphilic compounds added to the FLC mixtures of the invention may also be at least one amide of the general formula (IV):

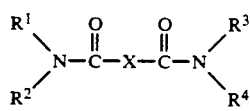

in which
$R^1$, $R^2$, $R^3$, $R^4$, independently of one another, are alkyl of 1 to 15 carbon atoms, in which one —CH$_2$— group can be replaced by —COO—, —CO— or —O—, cyclohexyl, phenyl or benzyl, and X is an alkylene of 2 to 9 carbon atoms, in which one or two non-adjacent —CH$_2$— groups can be replaced by —O—, in which two adjacent CH$_2$ groups can be replaced by 1,2-phenylene or 1,2-cyclohexylene, in which two adjacent —CH$_2$— groups can be replaced by —CH(CH$_3$)—CH(CH$_3$)—and in which a hydrogen atom of a CH$_2$ group can be substituted by $R^5$ or $R^6$, in which $R^5$ is alkyl of 1 to 15 carbon atoms, $R^6$ is alkyl of 1 to 15 carbon atoms or —CH$_2$— —CH$_2$—CO—NR$^1$R$^2$.

Preferably, a ferroelectric liquid crystal mixture is used which contains an amide of the formula (IV) in which $R^1$, $R^2$, $R^3$, $R^4$, independently of one another, are alkyl of 1 to 15 carbon atoms, in which a —CH$_2$— group can be replaced by —COO— or —O—,, cyclohexyl, phenyl, and X is an alkylene of 2 to 9 carbon atoms, in which one or non-adjacent —CH$_2$— group can be replaced by —O—, in which two adjacent CH$_2$ groups can be replaced by 1,2-phenylene or 1,2-cyclohexylene, in which two adjacent —CH$_2$— groups can be replaced by —CH(CH$_3$)—CH(CH$_3$)— and in which a hydrogen atom of a CH$_2$ group can be substituted by $R^5$ or $R^6$, in which $R^5$, $R^6$ independently of one another, are alkyl of 1 to 15 carbon atoms.

Amides of the formula (IV) in which
$R^1$, $R^2$, $R^3$, $R^4$, independently of one another, are alkyl of 1 to 15 carbon atoms, in which one —CH$_2$— group can be replaced by —COO—, or cyclohexyl, and X is an alkylene of 2 to 9 carbon atoms, in which one or two non-adjacent —CH$_2$— groups can be replaced by —O—, in which two adjacent CH$_2$ groups can be replaced by 1,2-phenylene, and in which two adjacent —CH$_2$— groups can be replaced by —CH(CH$_3$)—CH(CH$_3$)—, are particularly preferred.

Amides of the formula (IV) in which —X— represents one of the following groups

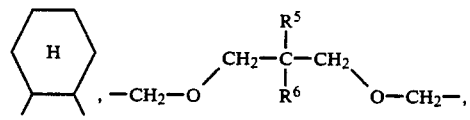

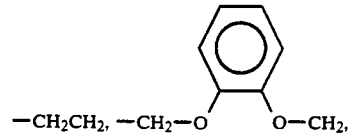

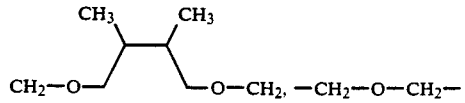

in which $R^1$ to $R^6$ have the abovementioned meanings are also particularly preferred.

It is very particularly preferred for —X— to represent the following groups

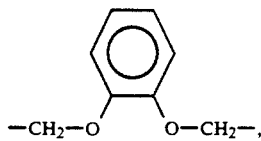

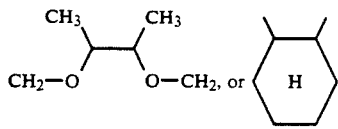

In principle, a wide range of ionophores is suitable for the use in FLC mixtures, but amides of the formula (IV) just described are particularly suitable for suppressing twist states.

The lipophilic or amphiphilic compounds added to the FLC mixtures of the invention may also be at least one compound of the general formula (V):

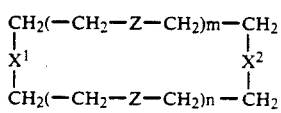

in which
—Z— is —O— or —S—;
m, n are integers greater than zero;
m+n is 2 to 6,
—X$^1$—, —X$^2$—, identical or different, are

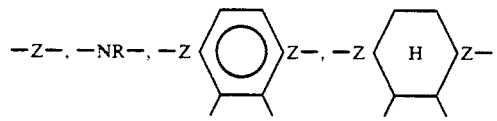

or
—X$^1$—, —X— together are >N—CH$_2$(—CH$_2$—Z—CH$_2$)$_l$—CH$_2$—N< or >N—CO(—CH$_2$—Z—CH$_2$)$_l$—CO—N<,
in which
—R is alkyl or alkanoyl of 1 to 15 carbon atoms, -phenyl, -benzyl or -benzoyl;
l is 1 or 2;
or the general formula (VI):

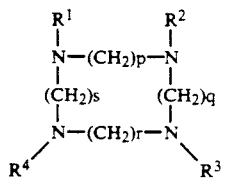

in which —R$^1$, —R$^2$, —R$^3$ and —R$^4$, independently of one another, are

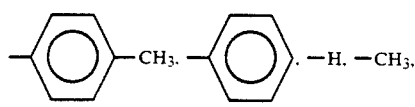

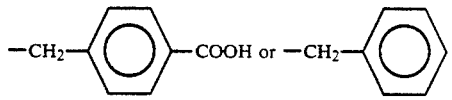

and p q, r, s, independently of one another, are an integer of 2 to 4, p+q+r+s being 8 to 16.

It is preferred to use a ferroelectric liquid crystal mixture which contains a compound of the formula (V) in which
m, n are integers greater than zero and
m+n is 2 to 4,
—X$^1$—, —X$^2$—, identical or different, are

 

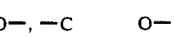

—X$^1$—, —X$^2$— together are >N—CH$_2$(—CH$_2$—O—CH$_2$)—CH$_2$—N< in which
—R is alkyl or alkanoyl of 1 to 15 carbon atoms, -phenyl, -benzyl or -benzoyl and
l is 1 or 2.

It is also preferred to use a ferroelectric liquid crystal mixture which contains a compound of the formula (VI) in which —R$^1$=—R$^2$=—R$^3$=—H and —R$^4$ is —H,

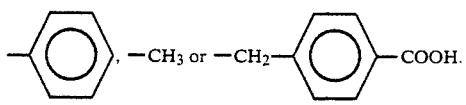

A further embodiment of the invention relates to FLC mixtures containing two or more different lipophilic or amphiphilic compounds of the general formula (III), (IV), (V) and/or (VI). The FLC mixtures according to the invention preferably contain 0.01 to 10 mol %, in particular 0.1 to 10 mol %, of the compounds. If more than one compounds is present in the mixture, the total amount is 0.01 to 10 mol %, preferably 1 to 10 mol %.

Surprisingly, it has been found that addition of complex ligands for ions to FLC mixtures can suppress the above-described ghost images and the twist states. It is even possible to cause switching of FLC mixtures having particularly high values for spontaneous polarization (Ps>35, in particular >50nC.cm$^{-2}$), which are otherwise incapable of switching in multiplex mode.

A further advantage of the invention is the sudden improvement in contrast. A further essential advantage is the FLC displays, which frequently become inoperable after relatively long storage, remain switchable even after a relatively long period by means of the FLC mixtures employed according to the invention. Since ionic impurities are responsible for the appearance of ghost images, and since these can be eliminated by addition of an excess of complex ligands, even ionic impurities introduced subsequently and arising, for example, through diffusion from the alignment layer have no adverse consequences.

Display devices according to the invention have FLC mixtures containing at least one lipophilic or amphiphilc compound, which is preferably a complex ligand for ions.

As a rule, the liquid crystal mixtures comprise 2 to 20, preferably 2 to 15, components, of which at least one is lipophilic or amphiphilic compound. The other components are preferably selected from the known compounds having nematic, cholesteric and/or tilted/smectic phases, which include, for example, Schiff's bases, biphenyls, terphenyls, phenylcyclohexanes, cyclohexylbiphenyls, pyrimidines, cinnamic esters, cholesteric esters, various bridged polynuclear esters of p-alkylbenzoic acids having polar end groups.

In general, the commercially available liquid crystal mixtures are present as mixtures of a wide range of components even before the compound(s) according to the invention is(are) added, at least one of which components being mesogenic, i.e. a compound which as a derivative or in a mixture with certain cocomponents shows a liquid crystal phase [i.e. is expected to form at least one enantiotropic (clearing temperature>melting temperature) or monotropic (clearing temperature<melting temperature) mesophase].

It is preferred to add lipophilic or amphiphilic compounds to FLC mixtures containing oxiranether, oxiranester and/or dioxolane derivatives. The chiral dopants having two chiral centers at cis or trans positions are both suitable to use for the FLC mixtures (see DE-B 36 33 968 and DE-B 37 18 174). Other dopants suitable for use in FLC mixtures containing lipophilic or amphiphilic compounds of the invention are described in DE-A 39 07 601, DE-A 38 32 502, DE-A 38 32 503, DE-A 38 275 99, DE-A 37 13 273, DE-A 37 03 228, DE-A 36 30 933, DE-A 36 18 213, DE-A 36 17 826 and DE-A 36 20 049. The liquid crystal mixtures mentioned above are advantageously used for the electro-optical switching and display devices.

The switching and display devices according to the invention (FLC light valves or displays) contain, inter alia, the following components: a liquid-crystalline mixture according to the invention (containing a lipophilic or amphiphilic compound), support plates (e.g. made of glass or plastic), coated with transparent electrodes (two electrodes), at least one orientation layer, spacers, adhesive frame, polarizers and for color displays thin color filter films. Further possible components are antireflection, passivation, compensation and barrier coatings and electric non-linear elements, such as, for example, thin-film transistors (TFT) and medal/insulator/metal (MIM) elements. The general structure of liquid crystal displays has already been described in detail in standard monographies (e.g. E. Kaneko, "Liquid Crystal TV Displays: Principles and Applications of Liquid Crystal Displays", KTK Scientific Publishers, 1987, pages 12-30 and 163-172).

Among the FLC light valves, switching devices which are driven by the multiplex process are preferred. Liquid crystal cells which operate in the SSFLC technique "surface stabilized ferroelectric liquid crystal") and in which the cell thickness (i.e. the spacing of the outer sheets) is 1 to 20 $\mu$m are particularly preferred. A cell thickness of 1 to 10 $\mu$m, in the birefringence mode in particular of 1.2 to 3 $\mu$m, is particularly preferred.

Furthermore, the compounds according to the invention are advantageously used for the operation of an SSFLC display in the so-called "guest-host mode", in which the optical effect is not based on birefringence phenomena but on the anisotropic absorption of dichroic dyes which are dissolved in an FLC matrix.

The compounds according to the invention suppress the occurrence of twist states for various geometries of the smectic layers in the SSFLC cell (see, for example, H. R. Dübal, C. Escher, D. Ohledorf; Proc. 6th Intl. Symp. on Electrets, Oxford, England (1988)). This is especially true of the so-called "virgin texture" in which the smectic layers are arranged at an angle ("chevron" geometry) and of the "bookshelf" or "quasi-bookshelf" geometry in which the smectic layers are arranged perpendicular to the glass plates (see Y. Sato et al., Jap. J. Appl. Phys. 28, 483 (1989)). The use of the compounds according to the invention in this "bookshelf" geometry is paticularly advantageous, since this not only leads to good dark states but also to high transmission of the bright state due to the large effective switching angle.

Furthermore, it has been found that the compounds according to the invention facilitate in FLC mixtures the field-induced generation of a homogeneous "quasi-bookshelf" geometry (Y. Sato et al., Jap. J. Appl. Phys. 28, 483 (1989))

An angle of quasi-bookshelf geometry of smectic layer is usually less than 10°, determined by X-ray diffraction measurement. After application of square pulse of low frequence and a high electric field the angle becomes smaller, and the structure .comes close to the bookshelf geometry. On the other hand, the angle of a smectic layer of chevron geometry is about 20° without pulse addressing for changing into quasi-bookshelf geometry.

Lipophilic or amphiphilic compounds used in the present invention allow the application of ferroelectric liquid crystal mixtures having a high spontaneous polarization and short switching time in liquid crystal displays. Therefore, as described in DE-B 39 09 354, for example, it is preferable to add lipophilic or amphiphilic compounds to an FLC mixture having a high spontaneous polarization of $Ps > 30nC.cm^{-2}$. In particular, when the structure of the FLC mixture is a bookshelf geometry, the effect of the addition of lipophilic or amphiphilic compounds is significant. In this ragand, the FLC mixture of the present invention can provide FLC displays having a reduced surface memory effect and a greatly improved display contrast.

It is also known that lipophilic or amphiphilic compounds used in the invention always increase the electrical conductivity. This is especially significant if the compound is a cryptand. In this case, an optical hysteresis and a twist state can be effectively eliminated.

When FLC light valves are addressed in multiplex mode, bias, i.e. the ratio of linear electric field and interval field (data pulse level), is an important parameter to affect to the operational contrast (see T. Harada, at. al., Japan Display Conference, 1986). In this case, a high bias level is demonstrated to be particularly preferable. Among the lipophilic or amphiphilic compounds of the invention, cryptands can provide a very high bias level.

In another aspect of the invention, the FLC mixture of the invention include more than two different complex ligands. Each of the many types of complex ligands can preferentially link to a certain type of cation (with respect to the selectivity, see, for example, M. Hiraoka, Crown Compound—Their characteristics and applications, Kodansha, Tokyo, 1982, 67-). In this case, FLC mixtures include 0.01 to 10 mol % of complex ligands in total. The introduction of the complex ligands sometimes accompanies the problems of solubility into FLC mixture, or of an influence to a liquid crystal phase. To avoid such problems, is particularly advantageous to use a mixture of coronands and cryptands. In this case, the FLC mixtures include 0.01 to 10 mol % of the compounds in total as well.

Generally, organic compounds containing polyimide or polyamide as a base composition are used for a liquid crystal alignment layer (see Mol. Cryst. Liq. Cryst., 109, 1, 1984). However, it is confirmed that alignment layer containing $SiO_2$ is especially suitable for the FLC mixture of the present invention. $SiO_2$ film is preferably obtained by spincoating or spraying of organic silicon compounds, or by dipping process, followed by a heat treatment at 100° to 400° C. Alignment properties are accomplished by rubbing the film in conventional manners (see DE-B 28 52 395, EP-A 0046401, DE-B 27 22 900). Other advantages of the rubbed $SiO_2$ are significantly improved insulation compared to polyimide, and high transparency even in a thick cell.

EXAMPLES

The following examples will illustrate the invention in greater detail.

EXAMPLE 1

Components of a liquid crystal basic mixture (Mixture 1) used for this example are:

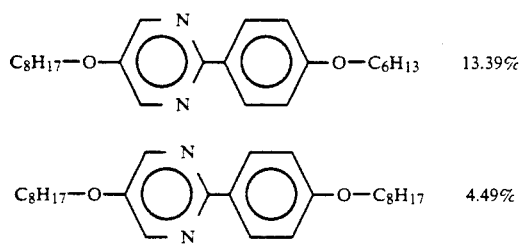

-continued

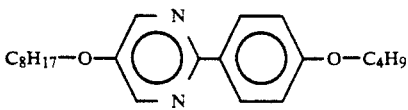

Mixture 1 had the following phase sequence:
X −5° Sc 14° SA 79.5° N 96° I

The structures of chiral dopants (Compounds 1 to 5), and an additive (Additive 1) were:

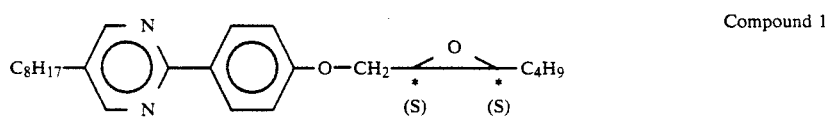

Compound 1

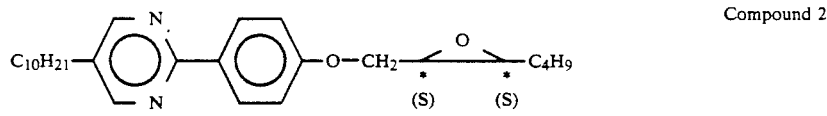

Compound 2

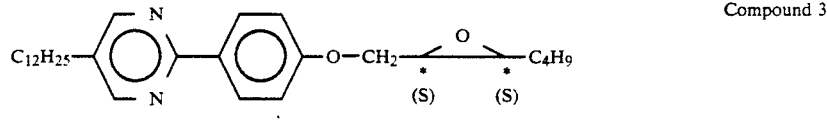

Compound 3

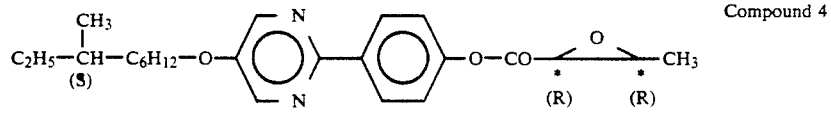

Compound 4

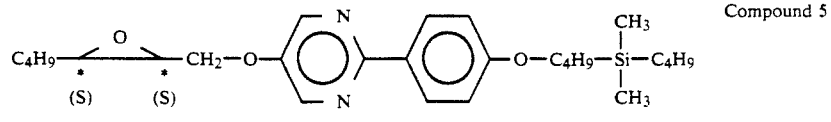

Compound 5

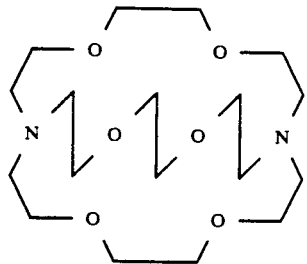

Additive 1

PI-cell (EHC, Tokyo) was used as a test cell.

FLC mixture (I) of the following components were prepared.

EXAMPLE 2

Chiral dopants (Compounds 6 to 8) and an additive (Additive 2) used for this example were:

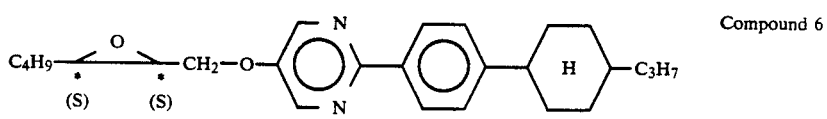

Compound 6

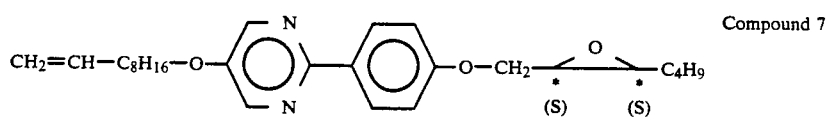

Compound 7

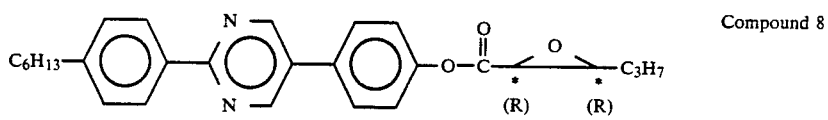

Compound 8

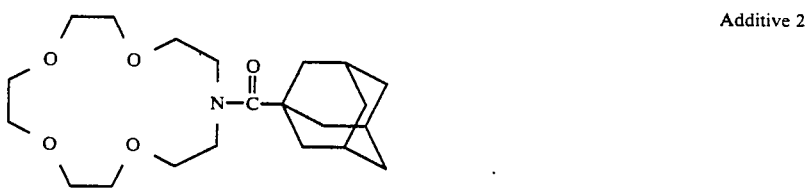

Additive 2

| Mixture 1 | 60% |
|---|---|
| Compound 1 | 8.8% |
| Compound 2 | 4.4% |
| Compound 3 | 8.8% |
| Compound 4 | 6% |
| Compound 5 | 12% |

FLC mixture (IV) of the following components was prepared.

| Compound 6 | 21.28% |
|---|---|
| Compound 7 | 7.54% |
| Compound 8 | 3.28% |
| Additive 2 | 1% |

FLC mixture (II) was composed of FLC mixture (I) and 0.2% of Additive 1. Test cells were filled with FLC mixture (I) or (II) at an isotropic condition (100° C.), then cooled down to room temperature. Switching properties of the liquid crystal test cells thus obtained were measured and summarized in Table 1.

A liquid crystal test cell was prepared using the above FLC mixture (IV) as described in Example 1. Square pulse of ±35 V and 10 Hz was addressed to the cell for changing the smectic structure to a bookshelf geometry.

TABLE 1

Switching properties of FLC mixture (I) and (II) (at 20° C.)

| Mixture | Phase Sequence | Helical Pitch Sc* (μm) | Ps (nC · cm$^{-2}$) | CPA (Vs/m) | 2θ dyn | 2θ mem | Surface Memory Free (°C.) |
|---|---|---|---|---|---|---|---|
| I | SC*70° SA78° N*82° I | 0.488 | 84 | 300 | 15 | 15 | 32 |
| II | SC*69.5° SA77.5° N*81.5° I | 0.488 | 84 | 300 | 17 | 17 | 48 |

The result shows that an addition of Additive 1 significantly reduced the surface memory and slightly increased a switching angle.

The switching properties of the FLC mixture in the bookshelf geometry were the following.

| | |
|---|---|
| 2 θ eff | 56° |
| CPA | 820 Vsm$^{-1}$ |
| Bias | 4.8 (pulse width 50 μm) |
| Ps | 55 nC·cm$^{-2}$ |

On the other hand, the FLC mixture (IV) without Additive 2 did not switch at all in a bookshelf geometry.

As shown in the above examples, an addition of lipophilic or amphiphilic compounds to FLC mixtures having a short helical pitch and a high spontaneous polarization allowed significantly improved switching properties, especially in the bookshelf, geometry.

We claim:

1. Ferroelectric liquid crystal mixtures having a spontaneous polarization of Ps>20nC.cm$^{-2}$ and a natural helical pitch of less than one half of the cell thickness, and comprising at least one lipophilizing, lipophilic and/or amphiphilic compound.

2. Display devices comprising ferroelectric liquid crystal mixtures as claimed in claim 1.

3. Electro-optical display devices having a FLC layer thickness of 1 to 10 μm pro, comprising ferroelectric liquid crystal mixtures, electrodes and alignment layer(s), in which said ferroelectric liquid crystal mixtures have a spontaneous polarization of Ps>20nC.cm$^{-2}$ and a natural helical pitch of less than one half of the cell thickness, and comprise at least one lipophilizing, lipophilic and/or amphiphilic compound.

4. Display devices as claimed in claim 3, in which the structure of smectic layer of said ferroelectric liquid crystal mixture is a bookshelf geometry or a quasi-bookshelf geometry.

5. Display devices as claimed in claim 4, in which said bookshelf geometry or quasi-bookshelf geometry is formed by an electric field treatment.

6. Display devices as claimed in claim 4, in which said bookshelf geometry or quasi-bookshelf geometry has a tilt angle of less than 10°.

* * * * *